(12) United States Patent
Dallaserra

(10) Patent No.: US 11,275,415 B2
(45) Date of Patent: Mar. 15, 2022

(54) DISSIPATING INTERCONNECTION MODULE FOR M.2 FORM FACTOR EXPANSION CARD

(71) Applicant: BULL SAS, Les Clayes-sous-Bois (FR)

(72) Inventor: Luc Dallaserra, Paris (FR)

(73) Assignee: BULL SAS, Les Clayes sous-Bois (FR)

( * ) Notice: Subject to any disclaimer, the term of this patent is extended or adjusted under 35 U.S.C. 154(b) by 107 days.

(21) Appl. No.: 16/822,358

(22) Filed: Mar. 18, 2020

(65) Prior Publication Data

US 2020/0301488 A1 Sep. 24, 2020

(30) Foreign Application Priority Data

Mar. 19, 2019 (FR) ..................................... 1902831

(51) Int. Cl.
  *G06F 1/20* (2006.01)
  *G06F 1/18* (2006.01)
(52) U.S. Cl.
  CPC .............. *G06F 1/206* (2013.01); *G06F 1/185* (2013.01); *G06F 1/187* (2013.01)
(58) Field of Classification Search
  CPC ..... F28D 1/00; F28D 3/02; F28D 3/04; F28D 7/0008; G06F 1/185; G06F 1/20; G06F 1/186; G06F 1/183; G06F 1/203; G06F 1/206; G06F 1/187; H01L 23/473; H01L 23/40; H05K 7/20509; H05K 7/205; H05K 7/20327; H05K 7/20281; H05K 7/20; H05K 1/0203; H05K 1/021; H05K 1/0212; H05K 1/0201; H05K 1/0272
  See application file for complete search history.

(56) References Cited

U.S. PATENT DOCUMENTS

| 8,027,162 B2 * | 9/2011 | Campbell ............ H05K 7/2079 361/699 |
| 8,913,384 B2 * | 12/2014 | David .................... H05K 13/00 361/679.53 |
| 9,298,231 B2 * | 3/2016 | Arvelo ...................... F28F 9/02 |

(Continued)

FOREIGN PATENT DOCUMENTS

FR  2 966 318 A1  4/2012

OTHER PUBLICATIONS

Search Report as issued in French Patent Application No. 1902831, dated Jan. 30, 2020.

*Primary Examiner* — Michael A Matey
(74) *Attorney, Agent, or Firm* — ARC IP Law, PC; Joseph J. Mayo

(57) ABSTRACT

A dissipating interconnection module for an M.2 form factor expansion card, includes a heat sink, which includes an enclosure including an upper wall for being in thermal contact with the first heat exchange surface of the expansion card and two tabs, each tab for being in thermal contact with the upper wall of the heat sink and for being in thermal contact with the fluid cooling system of the first electronic board, and the upper wall and the two tabs of the enclosure being arranged to form a space in which the expansion card can be received; a mechanical attachment system for removably mechanically attaching the expansion card to the heat sink; an interconnection electronic board including the second M.2 connector, a third electrical connector to be connected to a fourth electrical connector of the first electronic board.

8 Claims, 4 Drawing Sheets

(56) References Cited

U.S. PATENT DOCUMENTS

| | | | |
|---|---|---|---|
| 9,443,786 B1* | 9/2016 | Rippel | H01L 25/115 |
| 9,818,456 B1* | 11/2017 | Wu | H05K 7/1427 |
| 10,003,153 B1 | 6/2018 | Lai et al. | |
| 2006/0012959 A1* | 1/2006 | Lee | H01L 23/427 |
| | | | 361/700 |
| 2009/0277616 A1* | 11/2009 | Cipolla | H01L 23/473 |
| | | | 165/104.33 |
| 2010/0020487 A1* | 1/2010 | Lee | H01L 23/467 |
| | | | 361/679.49 |
| 2010/0130120 A1* | 5/2010 | Lee | G06F 1/185 |
| | | | 454/284 |
| 2010/0254089 A1* | 10/2010 | Anderl | H01L 23/4093 |
| | | | 361/702 |
| 2013/0120926 A1* | 5/2013 | Barina | F28D 15/0275 |
| | | | 361/679.32 |
| 2013/0135812 A1* | 5/2013 | Barina | H01L 23/473 |
| | | | 361/679.32 |
| 2013/0182389 A1* | 7/2013 | Demange | G06F 1/20 |
| | | | 361/679.54 |
| 2013/0194745 A1* | 8/2013 | Meijer | G06F 1/20 |
| | | | 361/679.47 |
| 2014/0009882 A1* | 1/2014 | Cox | H05K 7/20336 |
| | | | 361/679.31 |
| 2014/0118920 A1* | 5/2014 | Ng | G06F 1/20 |
| | | | 361/679.33 |
| 2014/0133093 A1* | 5/2014 | Cox | H01L 23/367 |
| | | | 361/679.54 |
| 2015/0169013 A1* | 6/2015 | Lai | G06F 1/20 |
| | | | 361/679.54 |
| 2016/0335220 A1 | 11/2016 | Breakstone et al. | |
| 2018/0295710 A1* | 10/2018 | Lai | H05K 7/20472 |
| 2019/0235155 A1* | 8/2019 | Lai | G02B 6/0085 |

\* cited by examiner

[Fig. 1]
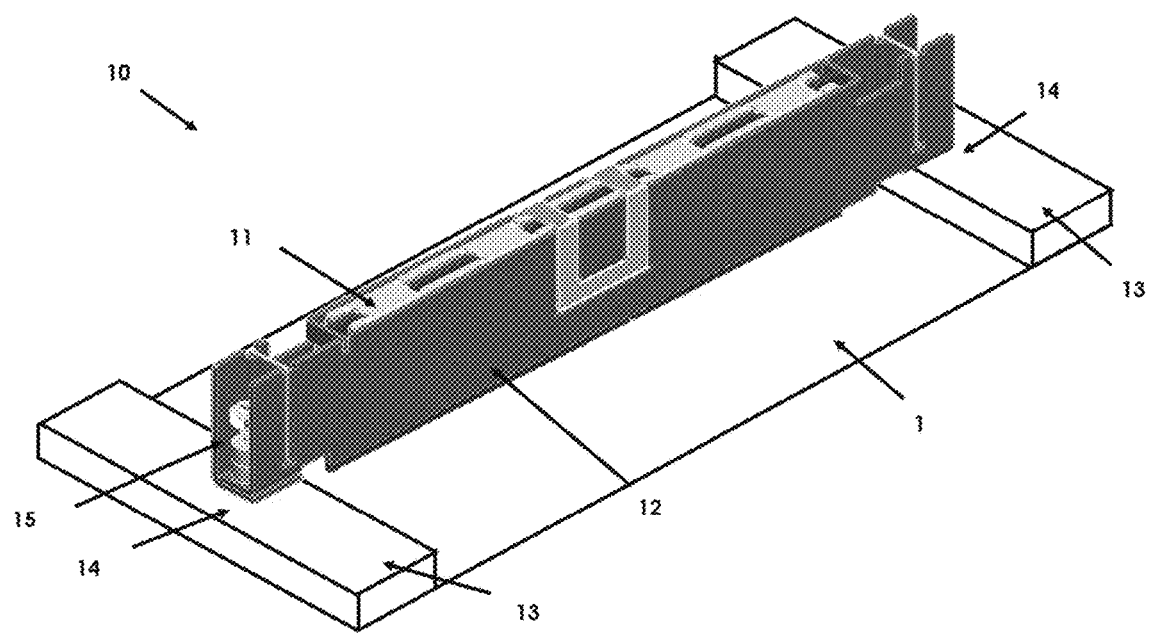
[Fig. 2]
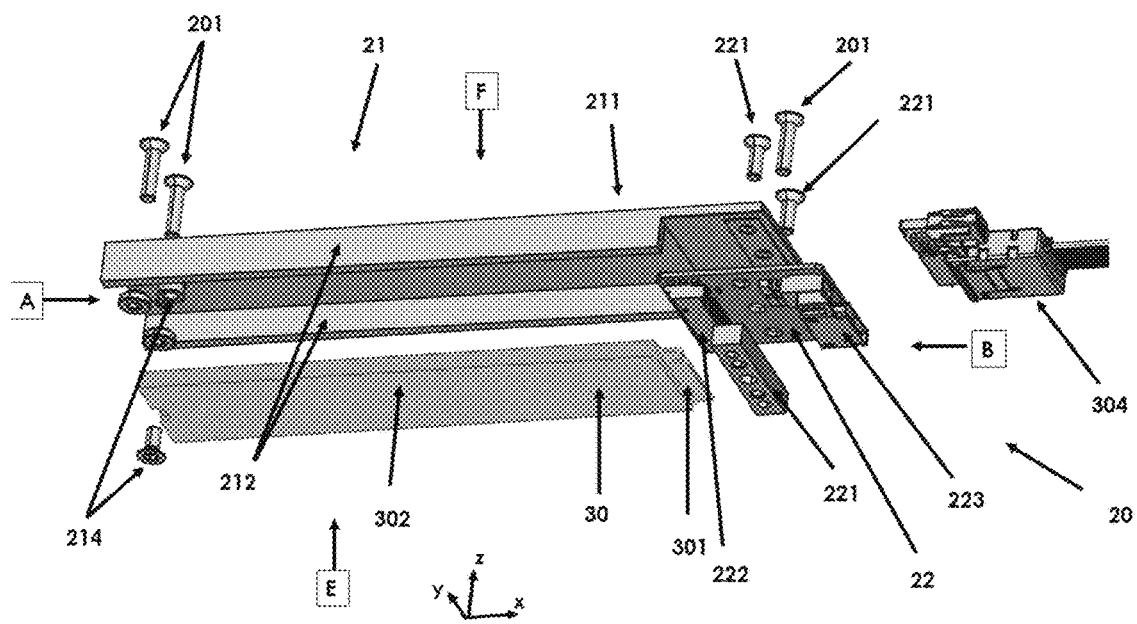

[Fig. 3]
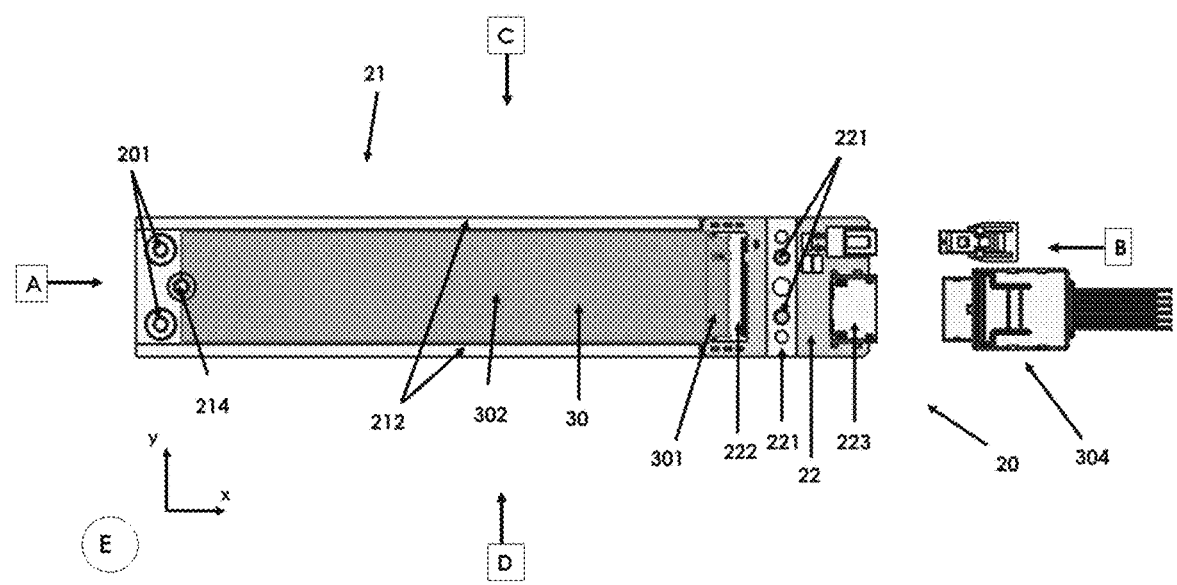
[Fig. 4]
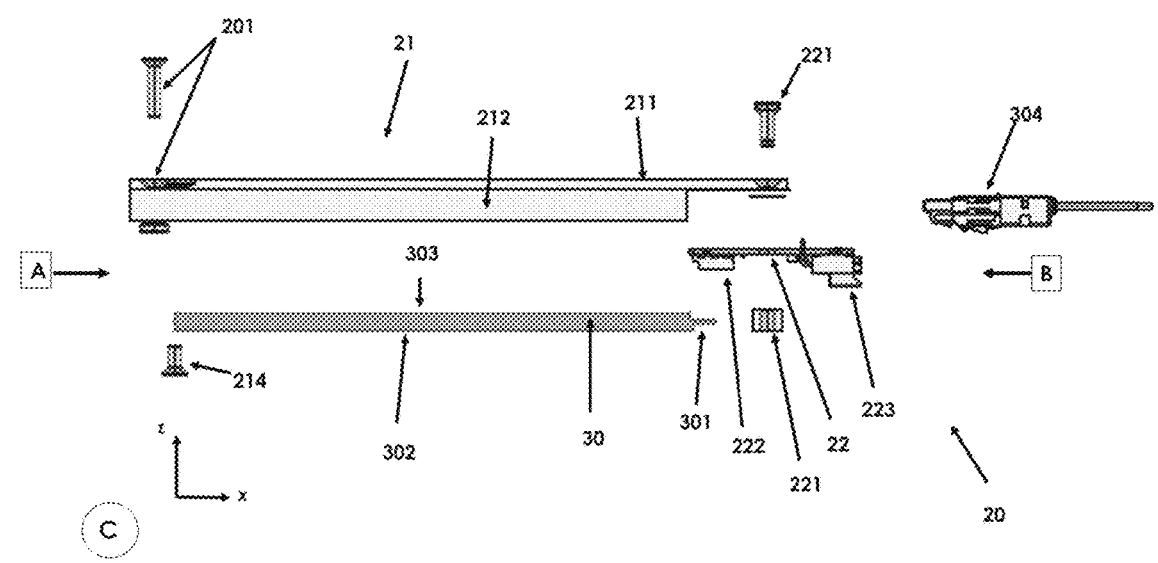

[Fig. 5]
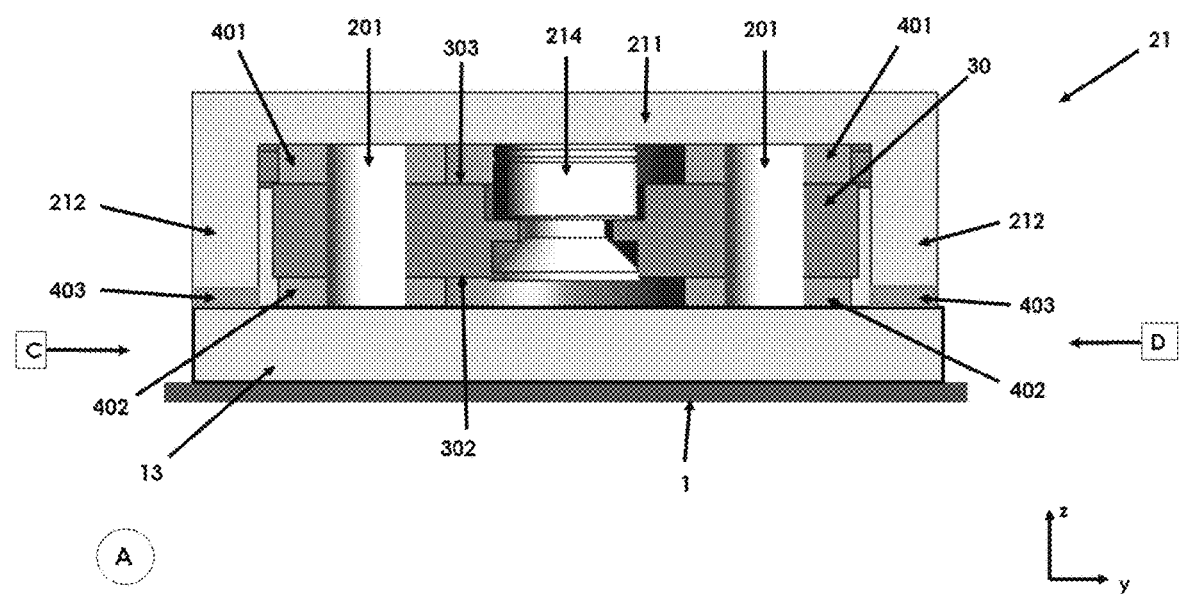
[Fig. 6]
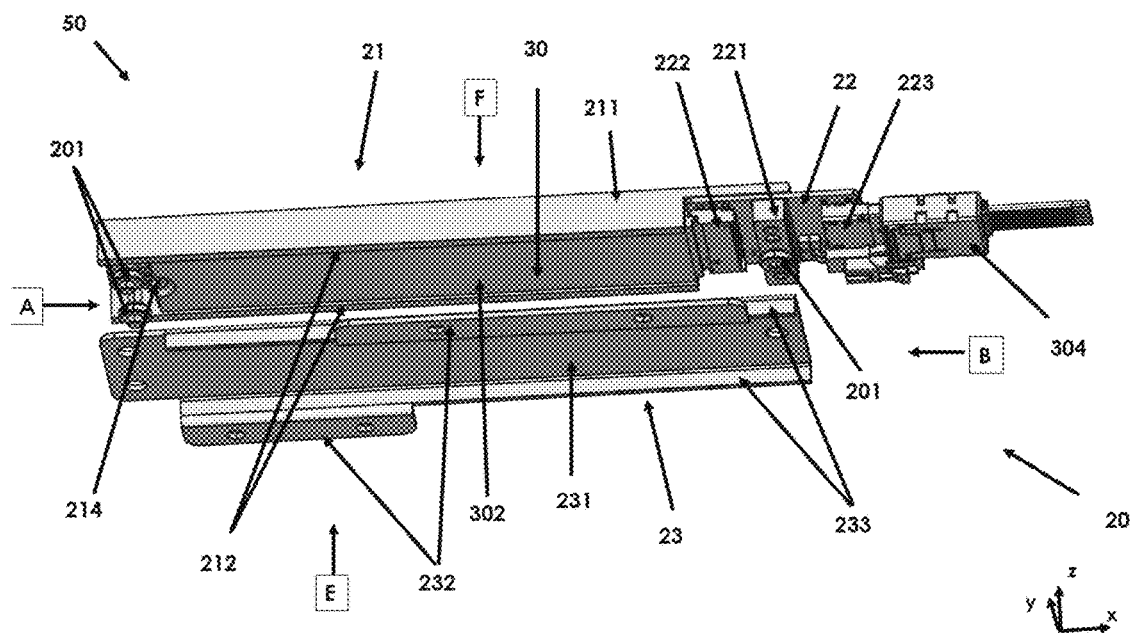

[Fig. 7]
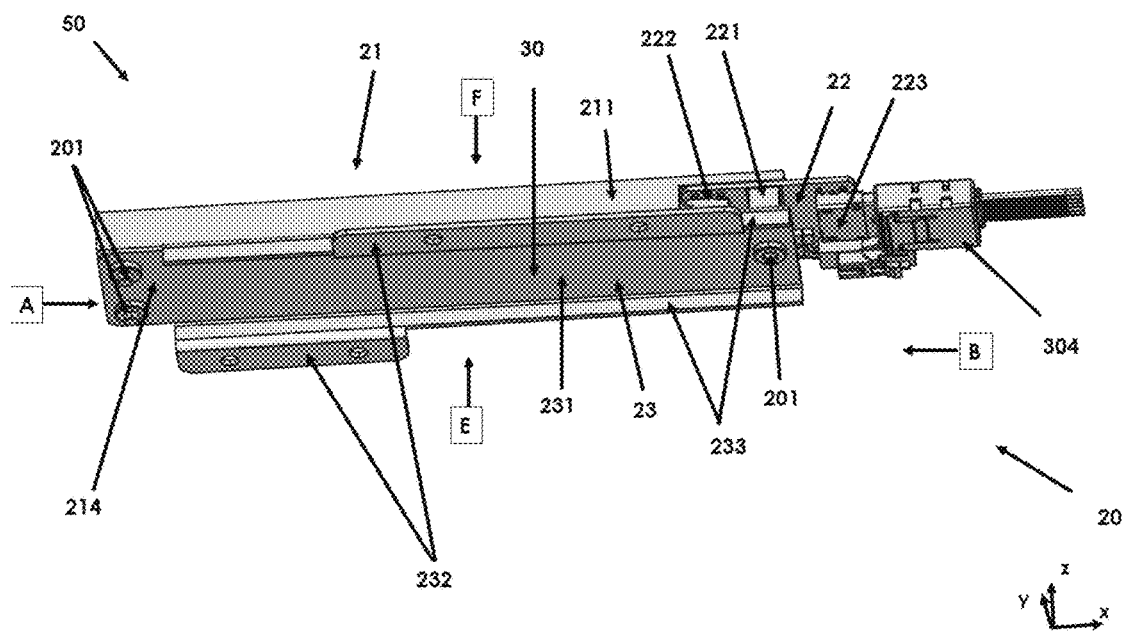
[Fig. 8]
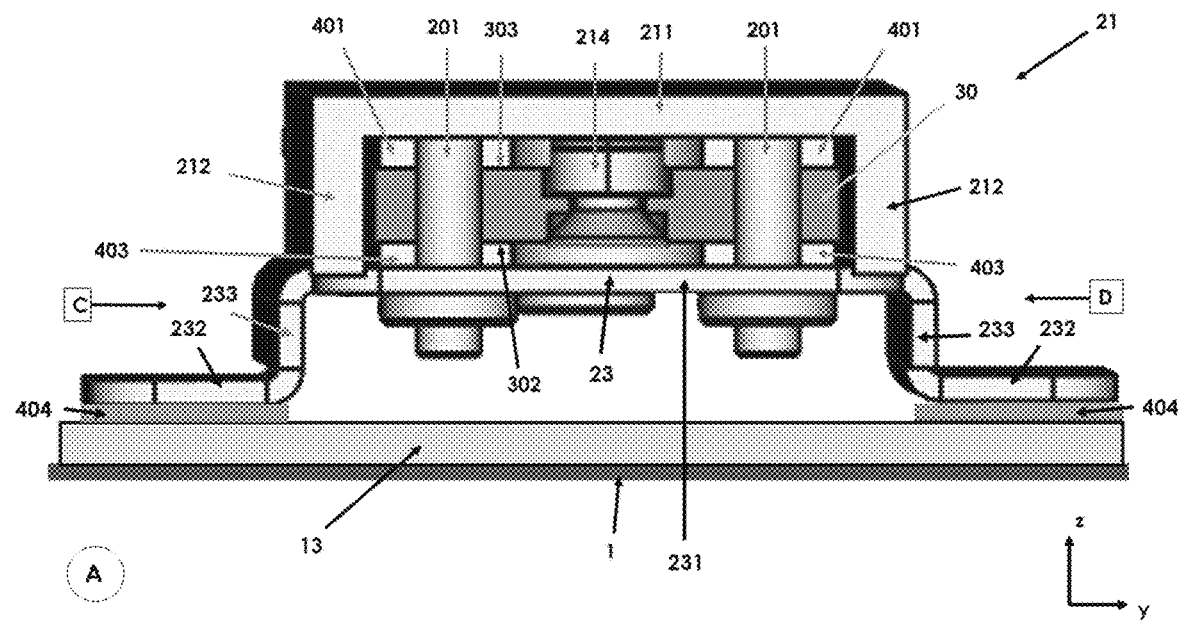

DISSIPATING INTERCONNECTION MODULE FOR M.2 FORM FACTOR EXPANSION CARD

CROSS-REFERENCE TO RELATED APPLICATIONS

This application claims the benefit of French Patent Application No. 1902831 filed Mar. 19, 2019, the disclosure of which is herein incorporated by reference in its entirety.

TECHNICAL FIELD OF THE INVENTION

The technical field of the invention is that of cooling modules for expansion cards.

The present invention relates to a dissipating interconnection module allowing the connection of an M.2 form factor expansion card to an electronic board and the cooling of this expansion card and in particular M.2 form factor expansion cards for compute blades that can be mounted in the rack of a computer cabinet.

TECHNOLOGICAL BACKGROUND OF THE INVENTION

Compute blades for computer cabinets may for example comprise processors, graphics cards, random access memory such as memory sticks, and mass storage such as hard disks. These compute blades are for example used to perform high-performance computing; therefore the components thereof release heat during operation and need to be cooled to ensure their proper operation and lifespan.

Since they are rack-mounted, the air circulation within the computer cabinet is not sufficient to effectively cool the compute blades with air-cooling systems.

For this reason, fluid cooling systems have been developed. These cooling systems comprise, for example, tubes, most often copper, in which a fluid flows. These tubes can be connected directly to the components to be cooled, for example by forming a loop around the components. The fluid can also circulate between two plates, metal for example, at least one of the two plates being directly connected to a component to be cooled. It is also possible to braze channels inside a metal plate, e.g. copper, to pass fluid through them. This allows the fluid to flow within a metal plate connected to a component, e.g. along a memory stick.

These fluid cooling systems are bulky since space is required around the components for the metal plates receiving the fluid.

Other hybrid cooling systems exist, which have the advantages of fluid cooling and those of dry contact cooling. This is the case, for example, of patent FR2,966,318, "Carte électronique pourvue d'un système de refroidissement liquide" (Electronic Board Equipped with a Liquid Cooling System), which proposes a cooling system comprising a cooling module in which a cooling liquid circulates, and a removable conductive heat sink, placed in contact with the surfaces of an electronic component via a thermal material to collect the heat energy produced by the component, where the heat sink is removably in dry contact with the cooling module, for example by screws. This system known from the state of the art is shown in FIG. 1. A reduced dimension around the component is possible with this system since no fluid flows around the component.

FIG. 1 shows a cooling system according to the state of the art.

Thus, in the cooling system 10 shown in FIG. 1, the heat energy produced by the electronic component 11 is recovered by the heat sink 12 through a thermal pad and then transferred to the fluid cooling system 13 via the dry contact points 14. The heat sink 12 and the fluid cooling system 13 are held together by screws 15 by dry contact. This makes the heat sink 12 removable, allowing access to the component 11. The only point of contact between the heat sink 12 and the fluid cooling module 13 is, therefore, the dry contact point 14.

The fluid cooling system 13 is also called a "cold plate" and can for example be metal, for example aluminum. This cold plate can, for example, extend along the entire compute blade and at least some of the compute blade components can be connected to it. The electronic component 11 can, for example, be a memory stick.

The heat sink 12 from FIG. 1 is in thermal contact with the component 11 when the component 11 is connected to the electronic board 1. Thus, if the component is a hard drive, a Wi-Fi or Bluetooth network card or even a satellite navigation card housing a GPS ("Global Positioning System") antenna.

The M.2 form factor was created to support several options for small size expansion cards, including SSD drives ("Solid-State Drive"), network cards or even satellite navigation cards. Initially, the smallest form factor for the SSD was mSATA, but mSATA could not evolve to capacities over 1 TB and keep sufficient profitability. Further, the mSATA connectors are bulky. The M.2 form factor, also called NGFF ("Next-Generation Form Factor") was created in order to maximize the use of the space of an electronic board while also reducing the footprint of the connector.

"Expansion card" is understood to mean an electronic board that can be connected to a computer module, for example to a computer cabinet, comprising a component set with which to extend the capacity of the computer module. According to this definition, an expansion card can be an SSD drive, a memory stick, a network card, a graphic card, a soundboard, or any other electronic board that can be connected to a computer module.

An M.2 form factor expansion card must be in vertical position in order to be cooled by using the cooling system 10 from the state-of-the-art shown in FIG. 1. In fact, the M.2 connector is located on one of two 22 mm wide edges. A semicircular hole is drilled on the opposite edge to allow the attachment of the component to an electronic board 1. It is therefore complex and costly to attach an M.2 form factor expansion card in vertical position on an electronic board 1.

Further, for an M.2 form factor expansion card, the most common dimensions are 22 mm wide and 30 mm long, 22 mm×42 mm, 22 mm×60 mm, 22 mm×80 mm and 22 mm×110 mm. These dimensions involve a significant height dimension when it is connected to an electronic board 1 in vertical position. It is not possible to use such an expansion card in vertical position in a compute blade rack mountable in a computer cabinet with a height of one rack unit (commonly called 1 U), meaning 44.45 mm.

The cooling system 10 from the prior art is not adaptable for a horizontally mounted M.2 form factor expansion card, in particular because it is not possible to cool both hot surfaces of the expansion card and to removably attach the system 10 from the prior art while keeping the expansion card horizontally connected to the electronic board 1. Further, M.2 form factor expansion cards are not hot pluggable and unpluggable. Thus, to perform a maintenance operation on the M.2 form factor expansion card or on the cooling system 10 from the state-of-the-art, it would be necessary to cut power to the compute blade, which is not desirable in the case, for example, of a computer cabinet dedicated to high-performance computing.

There is therefore a need for a system allowing the cooling of both surfaces of an M.2 form factor expansion card and simple maintenance, without the M.2 form factor expansion card having a significant vertical dimension.

SUMMARY OF THE INVENTION

The invention provides a solution to the problems previously discussed, by allowing effective cooling of both surfaces of an M.2 form factor expansion card and a horizontal arrangement of the module, while also allowing mounting and unmounting of the heat sink for the system from the invention without having to disconnect the M.2 form factor expansion card and therefore without having to cut power to the electronic board to which it is connected.

One aspect of the invention thus relates to a dissipating interconnection module for an M.2 form factor expansion card, where said expansion card has to be connected to a first electronic board comprising a fluid cooling system, where said expansion card comprises a first thermal exchange surface, a second thermal exchange surface and at least one first M.2 connector configured for being connected to at least one second M.2 connector, and where said dissipating interconnection module is characterized in that:

the dissipating interconnection module comprises a heat sink, where said heat sink comprises:

an enclosure comprising an upper wall configured for being in thermal contact with the first heat exchange surface of the expansion card, where the enclosure further comprises two tabs, where each tab is configured for being in thermal contact with the upper wall of the heat sink and for being in thermal contact with the fluid cooling system for the electronic board, and where the upper wall and the two tabs of the enclosure are arranged so as to form a space in which the expansion card can be received;

a mechanical attachment system configured for removably mechanically attaching the expansion card to the heat sink;

the dissipating interconnection module comprises an interconnection electronic board, where said interconnection electronic board comprises the second M.2 connector, at least one third electrical connector configured to be connected to at least one fourth electrical connector of the first electronic board, and where the interconnection electronic board is configured for being removably mechanically attached to the heat sink;

the dissipating interconnection module is configured for being removably mechanically attached to the first electronic board.

Beyond the characteristics which were just discussed in the previous paragraphs, the dissipating interconnection module according to an aspect of the invention can have one or more additional characteristics among the following, considered individually or according to all technically possible combinations:

The heat sink further comprises a lower wall configured for being in thermal contact with the second thermal exchange surface of the expansion card, with each tab of the enclosure of the heat sink and with the fluid cooling system, where said lower wall is inserted between the enclosure of the heat sink and the fluid cooling system of the first electronic board.

Each thermal contact of the heat sink is made by a thermal interface, where each thermal interface is included in a plurality of thermal interfaces, and where the plurality of thermal interfaces is included in the heat sink.

The M.2 form factor expansion card is an M.2 form factor SSD drive.

The mechanical attachment system for the heat sink comprises at least one screw.

The interconnection module is removably mechanically attached to the first electronic board by an attachment system comprising at least one screw.

The interconnection electronic board is removably mechanically attached to the heat sink by an attachment system comprising at least one screw.

The third connector of the electronic interconnection board and the fourth connector of the first electronic board are storage connectors of the same type.

Because of the invention, it is possible to cool an M.2 form factor expansion card while making maintenance of both the heat sink from the invention and the M.2 form factor expansion card easier. In fact, the dissipating interconnection module according to the invention serves both to cool an M.2 expansion card with the heat sink, and to connect the M.2 expansion card horizontally to an electronic board which implements the inner connection with the first electronic board to which the expansion card must be connected. With this interconnection, the M.2 expansion card can always be connected in the same disposition, independently of the arrangement of the connector on the motherboard, and therefore always be cooled in the same disposition.

By having the enclosure of the heat sink in thermal contact with the fluid cooling system of the first electronic board and with the first heat exchange surface of the expansion card, the thermal path between each heat exchange surface of the M.2 expansion card and the thermal cooling system can advantageously be the shortest possible.

When it is mentioned that two elements are "in thermal contact," it is understood that at least one surface of one element captures the heat released by the other surface, either by being in direct contact or through a thermal interface, for example formed by a thermal paste or any other thermal material.

A thermal interface is made of a thermal material, such as a soft thermal paste. For example, this soft thermal paste may include silicone. An advantage of using a soft thermal paste is that it is deformable. Thus, it is possible to have an optimal thermal contact while reducing the risk of damaging the components of the expansion card 30. Further, because it is deformable, compression of the thermal interface is therefore possible in order to produce a better thermal contact.

Further, the enclosure has two tabs in thermal contact with the upper wall of the enclosure and with the cooling system. With the upper wall of the enclosure, these two tabs form a space laid out to receive the M.2 expansion card, and therefore advantageously allow the enclosure of the heat sink to enclose the M.2 expansion card for recovering a larger portion of the heat released and for directing it to the cooling system, while also protecting the M.2 expansion card from possible impacts. Further, the cost of producing the enclosure is low because it only has an upper wall and two tabs. This enclosure alone can cool the M.2 expansion card and also has a very small height dimension.

The interconnection electronic board is mechanically removably attached to the heat sink. Because this mechanical attachment is removable, maintenance is easier since the heat sink can advantageously be separated from the interconnection board without disconnecting the interconnection board from the first electronic board.

Additionally, the heat sink comprises an attachment system with which to removably mechanically attach the M.2 expansion card to the heat sink. Because this mechanical attachment is removable, the heat sink can be separated from the M.2 expansion card and therefore the M.2 expansion card does not have to be disconnected from the interconnection board. This way for example, maintenance can be done on the heat sink without disconnecting the M.2 expansion card from the electronic interconnection board and without disconnecting the electronic interconnection board from the first electronic board and thus the electronic connection between the M.2 expansion card and the first electronic board can be maintained.

The heat sink of the dissipating interconnection module may further comprise a lower wall in thermal contact with the tabs of the heat sink enclosure, with the second thermal exchange surface of the M.2 expansion card and with the fluid cooling system of the first electronic board. This way, because of the enclosure and the lower wall, a heat sink can advantageously envelop the M.2 expansion card and therefore better protect the expansion card during a maintenance operation.

BRIEF DESCRIPTION OF THE FIGURES

The figures are presented for information purposes only and in no way limit the invention.

FIG. 1 shows a schematic view of a cooling system according to the state of the art.

FIG. 2 shows a schematic exploded view of the dissipating interconnection module according to a first embodiment of the invention.

FIG. 3 shows a schematic, bottom view of the dissipating interconnection module according to a first embodiment of the invention.

FIG. 4 shows a schematic exploded, front view of the dissipating interconnection module according to a first embodiment of the invention.

FIG. 5 shows a schematic, side view of the dissipating interconnection module according to a first embodiment of the invention.

FIG. 6 shows a schematic, partially exploded view of the dissipating interconnection module according to a second embodiment of the invention.

FIG. 7 shows a schematic view of the dissipating interconnection module according to a second embodiment of the invention.

FIG. 8 shows a schematic, side view of the dissipating interconnection module according to a second embodiment of the invention.

DETAILED DESCRIPTION OF AT LEAST ONE EMBODIMENT OF THE INVENTION

The figures are presented for information purposes only and in no way limit the invention. Unless otherwise specified, the same element appearing on different figures shall have a single reference.

FIG. 2 shows a schematic, exploded view of the dissipating interconnection module according to a first embodiment of the invention.

The dissipating interconnection module 20 according to the invention is shown schematically in FIG. 2 in a three-dimensional exploded view along the x, y and z axes. Four references are shown: A, B, E and F. The references A and B each represent one side view, side A for reference A and side B reference B. The reference E represents a bottom view and the reference F represent a top view.

The dissipating interconnection module 20 according to a first embodiment of the invention comprises an interconnection electronic board 22 and a heat sink comprising an enclosure 21. This dissipating interconnection module 20 provides cooling for an M.2 form factor expansion card 30 by means of the heat sink that it comprises and, by means of the electronic interconnection board that it comprises, the interconnection of this expansion card 30 with a first electronic board 1 (not shown in FIG. 2), for example, a motherboard, for example the motherboard of a compute blade rack mountable in a computer cabinet.

As previously shown, this M.2 form factor expansion card 30 can for example be an M.2 form factor SSD drive (Solid-State Drive) or any other board with which to expand the capacity of a computer module. The expansion card 30 comprises at least one first M.2 connector, for example a male M.2 connector configured for being connected to at least one second M.2 connector, for example a female M.2 connector. The expansion card 30 further comprises two heat exchange surfaces, a first heat exchange surface 303 and the second heat exchange surface 303.

When the expansion card 30 is an M.2 form factor SSD drive dissipating by both surfaces, meaning that each of the surfaces thereof releases heat because it comprises operating components on each of the two surfaces thereof, one surface of the SSD drive is the first thermal exchange surface and the other surface is the second thermal exchange surface. When the M.2 form factor SSD drive dissipates heat by only one surface, meaning when it includes components on only one surface, the surface dissipating the heat can be the first thermal exchange surface or the second thermal exchange surface. The other surface of the SSD drive not dissipating heat is then the other thermal exchange surface.

The enclosure 21 of the dissipating interconnection module 20 comprises an upper wall 211 and two tabs 212. The wall 211 is called "upper" because in a preferred embodiment, when the dissipating interconnection module 20 is mechanically removably attached to the upper surface, meaning the surface turned towards the reference F, of a first electronic board in horizontal position, the wall 211 is located above the expansion card 30 and other components of the dissipating interconnection module 20, for example of the interconnection electronic board 22. It will be obvious for the person skilled in the art that other arrangements, for example when the dissipating interconnection module 20 is removably mechanically attached to the lower surface of the first electronic board in horizontal position, the upper wall is still the wall 211 even though it is no longer positioned above the expansion card 30.

The term "upper" for designating the wall 211 therefore refers to the position thereof in the preferred embodiment relative to the other components of the dissipating interconnection module 20 as previously described.

The upper wall 211 can for example be aluminum, copper or any other heat-conducting material.

Each of the two tabs 212 included in the enclosure 21 is in thermal contact with the upper wall 211. The two tabs 212 can for example be made of the same heat conducting material as the upper wall 211. The two tabs 212 can for example be integral with the upper wall 211 for example by having been formed by extrusion of material in a block of heat-conducting material.

The two tabs 212 and the upper wall 211 are disposed so as to form a space suited for receiving the expansion card.

For example, in a preferred embodiment shown in FIG. 2, this arrangement is U-shaped, meaning that the two tabs 212 each extend along a longitudinal edge of the lower surface of the upper wall 211. "Lower surface" is understood to mean the surface of the upper wall 211 turned towards the ground when the upper wall 211 is in horizontal position in a horizontal plane along the x longitudinal and y transverse axes of FIG. 2. "Longitudinal edge" is understood to mean an edge of the lower surface of the upper wall 211 along the x longitudinal axis of FIG. 2, meaning one of the two longer edges of the lower surface of the upper wall 211, as shown in FIG. 2. Thus, a tab 212 "extends along" a longitudinal edge when the tab 211 is parallel to this longitudinal edge. For example, the tabs 212 can be perpendicular to the upper wall 211 while also being parallel to a longitudinal edge of the lower surface of the upper wall 211, as shown in FIG. 2.

The spacing between the two tabs 211 is thus calculated for receiving the expansion card 30 between the two tabs 212. The spacing between the two tabs 212 is therefore at least the width of the expansion card 30 when it is arranged horizontally as shown in FIG. 2, for example the width is at least 22 mm in the case of an M.2 form factor SSD drive. The height of the tabs 212 along the z axis is calculated to receive the expansion card 30, meaning at least the thickness of the expansion card 30. The length of the upper wall 211 can also be calculated for receiving the expansion card 30, for example in order to be in thermal contact with the entire first heat exchange surface of the expansion card 30. Thus, if the expansion card 30 has a length of 80 mm, the upper wall 211 will have a length greater than 80 mm, in order for example to be in thermal contact with the entire first thermal exchange surface of the expansion card 30 and to have a sufficiently large surface for mechanically attaching the electronic interconnection board 22.

When the expansion card 30 is received in the space formed by the tabs 212 and by the upper wall 211, the first thermal exchange surface 303 of the expansion card 30 is in thermal contact with the lower surface of the upper wall 211.

The enclosure 21 of the dissipating interconnection module 20 further comprises a mechanical attachment system 214 configured for removably mechanically attaching the expansion card 30 to the heat sink of the dissipating interconnection module 20. In the preferred embodiment shown in FIG. 2, the expansion card 30 is removably mechanically attached to the enclosure 21 of the heat sink by the attachment system 214. "Removably attached" means the fact of being able to anchor the expansion card 30 to the enclosure 21 such that this anchoring is reversible, meaning that it is possible for the expansion card 30 to no longer be anchored to the enclosure 21. The attachment system 214 can, for example, comprise a screw comprising threads and a hole in the enclosure 21 for receiving the screw, the hole comprising threads with which to screw the screw into the hole and thereby removably attach the expansion card 30 to the enclosure 21. Further, the M.2 form factor expansion card imposes the presence of a semicircular hole on the edge opposite the edge where the first M.2 connector is. This hole allows the expansion card to be attached by the screw of the attachment system 214. The mechanical attachment system 214 can comprise several threaded holes in the enclosure 21 for receiving a screw in order to be compatible with several M.2 expansion card 30 lengths. For example, when the expansion card 30 is an M.2 form factor SSD drive, the mechanical attachment system 214 can comprise several holes, for example one hole with which to attach an M.2 SSD drive that is 80 mm long, another hole with which to attach an M.2 SSD drive that is 100 mm long. This allows compatibility with M.2 expansion cards 30 of various lengths, and therefore has the possibility of keeping the same enclosure 21 and the same dissipating interconnection module 20 while changing the M.2 expansion card 30 for another M.2 expansion card 30 of different length.

The interconnection electronic board 22 of the dissipating interconnection module 20 comprises a second M.2 connector 221 for connection with the first M.2 connector 301 of the expansion card 30. For example, and as shown in FIG. 2, the interconnection electronic board 22 may comprise a female M.2 connector 222, for connection with the male M.2 connector 301 of the expansion card 30. The interconnection electronic board 22 of the dissipating interconnection module 20 further comprises at least a third electric connector 223 for connection with at least a fourth electric connector 304 of the first electronic board, for example a motherboard. This third connector 223 may for example be a storage expansion connector when the expansion card 30 is an SSD drive. When this is the case, the connector 223 can then be an OCuLink® connector ("Optical Copper Link," where Cu is the chemical symbol for copper), a Thunderbolt® connector, a PCI Express® connector, a SATA connector (Serial Advanced Technology Attachment) or any other storage expansion connector. The fourth connector 304 of the first electronic board, for example a motherboard, is a connector of the same type configured for being connected to the third connector. For example, it is a storage expansion connector.

The interconnection electronic board 22 is configured for being removably mechanically attached to the heat sink comprising the enclosure 21. For example, as shown in FIG. 2, the interconnection electronic board 22 can be removably mechanically attached to the enclosure 21. To implement this removable mechanical attachment, the interconnection electronic board 22 comprises for example an attachment system 221 comprising for example two threaded screws. The attachment system 221 may also comprise a block comprising threaded holes which may for example have the function of a nut.

Thus, the block may receive the threaded screws, which can be screwed into the threaded holes of the block, thus removably mechanically attaching the electronic interconnection board 22 to the enclosure 21. This block may for example have a length equal to the width of the electronic interconnection board 22 and a width greater than the diameter of the largest threaded hole that it comprises. The dimension of this block and its arrangement are such that it does not disturb the operation of the interconnection electronic board 22 and that it is not in contact with an electronic component of the interconnection electronic board 22.

The dissipating interconnection module 20 is configured for being removably mechanically attached to the first electronic board 1, for example to a motherboard. To implement this attachment, the dissipating interconnection module 20 comprises a mechanical attachment system, for example the mechanical attachment system 201. The mechanical attachment system 201 may for example comprise three threaded screws, with each screw having a longer length than the height of the tabs 212 in order to be screwed into the first electronic board 1 while also passing through holes, for example three holes, included in the enclosure 21. The enclosure 21 may for example comprise two holes for receiving two of the three screws from the attachment system 201 near one edge of the upper wall 211 for example near one end of the expansion card 30 as shown in FIG. 2. The enclosure may comprise the third hole for receiving the third screw from the attachment system 201 near an opposite edge of the upper wall 211, for example near the electronic interconnection board 22 as shown in FIG. 2. The electronic interconnection board 22 may also comprise a hole, aligned with the third hole of the upper wall 211 in order to removably mechanically attach the assembly of the dissipating interconnection module 20 to the first electronic board 1.

FIG. 3 shows a schematic, bottom view of the dissipating interconnection module 20 according to a first embodiment of the invention.

"Bottom view" is understood to mean a view along reference E. The reference E represents a view of the surfaces of the dissipating interconnection module 20 turned towards the first electronic board 1 in a plane along the x longitudinal and y transverse axes, when the dissipating interconnection module 20 is removably mechanically attached in horizontal position to the upper surface of the first electronic board 1. The first electronic board 1 is not shown.

FIG. 3 shows two references C and D, each reference represents one view of a surface of the dissipating interconnection module 20. The reference C represents a view of the surface C and the reference D represents a view of the surface D.

In the first embodiment of the invention, shown in FIG. 1, the expansion card 30 is removably mechanically attached to the enclosure 21 of the heat sink of the dissipating interconnection module 20 via the attachment system 214. Thus, the expansion card 30 is in thermal contact with the upper wall 211. The expansion card 30 is not in thermal contact with the lower surface of the tabs 212 because this lower surface of the tabs 212 is intended to be in thermal contact with the fluid cooling system 13 as will be explained and shown in FIGS. 5 and 6. "Lower surface" of the tabs 212 is understood to mean the surface of the tabs 212 visible in bottom view when the dissipating interconnection module 20 is in the preferred embodiment, as shown in FIG. 3.

Also, the interconnection electronic board 22 is removably mechanically attached to the enclosure 21 of the heat sink of the dissipating interconnection module 20 via the attachment system 221.

The interconnection electronic board 22 can for example have the same width as the upper wall 211 of the enclosure 21 of the heat sink of the dissipating interconnection module 20. It may further comprise a fifth connector dedicated to power for connection with a sixth connector on the first electronic board 1 dedicated to power.

FIG. 4 shows a schematic, front exploded view of the dissipating interconnection module 20 according to a first embodiment of the invention.

"Front view" is understood to mean a view of the dissipating interconnection module 20 in a plane of the z and x longitudinal axes, along the reference C.

The interconnection electronic board 22 may for example be removably mechanically attached to the enclosure 21 of the heat sink of the dissipating interconnection module 20 at the center thereof along the x longitudinal axis. In fact, since the holes of the attachment system 221 are located near the central axis of the electronic board, room can be left at both ends of the board for placing the third connector 223 and the M.2 connector 222 there.

FIG. 4 shows that the tabs 212 of the enclosure 21 advantageously start near the lower surface of the upper wall 211 in order to improve stiffness and solidity. In fact, if the upper wall 211 and the tabs 212 are not rigidly connected, the upper wall 211 then rests on the upper surface of the tabs 212 in the preferred embodiment.

FIG. 5 shows a schematic, side view of the dissipating interconnection module 20 according to a first embodiment of the invention.

"Side view" is understood to mean a view along one of the side references A or B. FIG. 5 shows a schematic view of side A along the reference A. The view of side A is opposite to the view of side B of the dissipating interconnection module 20. The side view B is the view in the plane of the y transverse axis and the z axis, of the side of the connector 223 and the electronic interconnection board 22.

FIG. 5 shows the dissipating interconnection module 20 when it is removably mechanically attached to the first electronic board 1. The dissipating interconnection module 20 is removably mechanically attached to a fluid cooling system 13 of the electronic board 1 by the attachment system 201 already previously presented. This fluid cooling system 13 is attached to the first electronic board 1.

In a variant, the dissipating interconnection module 20 can be removably mechanically attached directly to the electronic board 1, for example by means of holes made in the fluid cooling system 13 in order to allow the attachment system 201 to reach the first electronic board 1.

When the dissipating interconnection module 20 is removably mechanically attached to the first electronic board 1, for example by being removably mechanically attached to the fluid cooling system 13 as shown in FIG. 5, the tabs 212 are in thermal contact with the fluid cooling system 13 and with the upper wall 211. As shown in FIG. 5 and in a preferred embodiment, the tabs 212 are integral with the upper wall 211.

When it is indicated that "the tabs 212 are in thermal contact with the fluid cooling system 13," it is understood that at least one part of the lower surface of the tabs 212 is in thermal contact with at least one part of the fluid cooling system 13 included in the first electronic board 1.

The expansion card 30 is removably mechanically attached to the enclosure 21 of the heat sink of the dissipating interconnection module 20 by means of the attachment system 214 previously described. The thermal exchange surface 303 of the expansion card 30 is in thermal contact with the lower surface of the upper wall 211. In a preferred embodiment, and as shown in FIG. 5, this thermal contact is made by a thermal interface.

When the dissipating interconnection module 20 is removably mechanically attached to the first electronic board 1, for example by being removably mechanically attached to the fluid cooling system 13 as shown in FIG. 5, the thermal exchange surface 302 of the expansion card 30 is advantageously in thermal contact with the fluid cooling system 13.

The dissipating interconnection module 20 according to the invention thus serves to cool both thermal exchange surfaces of the M.2 form factor expansion card 30 while also allowing simple maintenance. In fact, it is sufficient for an operator to use the attachment systems 201 and 214 for separating the enclosure 21 of the heat sink of the dissipating interconnection module 20 from the first electronic board 1, from the expansion card 30 and from the interconnection electronic board 22. This way, maintenance can be done on the dissipating interconnection module 20, meaning the heat sink, while keeping the expansion card 30 connected to the first electronic board 1. This connection is implemented via the interconnection electronic board 22 in order to be compatible with several types of connectors, for example when the first electronic board 1 does not have an M.2 connector, or when none of the M.2 connectors thereof are available. Further, that makes it possible, independently of the disposition of the connector on the first electronic board 1, to have the same disposition of the expansion card 30 when it is connected and therefore to be able to use the same heat sink shape in the dissipating interconnection module 20.

The expansion card 30 is further protected by the U-shape of the enclosure 21 of the heat sink. This way it is also possible to have the shortest thermal path between the thermal exchange surface 303 of the expansion card 30 and the fluid cooling system 13 while also having the expansion card 30 in horizontal position in a plane of the x longitudinal and y transverse axes in order to have the smallest possible vertical, therefore along the z axis, dimension.

In a preferred embodiment, a thermal interface is inserted near each thermal contact, as shown in FIG. 5. Meaning that there is a thermal interface at each thermal contact, for example, a thermal interface 401 is present between a heat exchange surface of the expansion card 30 and the lower surface of the upper wall 211. For example, there is a thermal interface 403 between a tab 212 and the fluid cooling system 13. For example, there is a thermal interface 402 between the expansion card 30 and the fluid cooling system 13.

FIG. 6 shows a schematic, partially exploded view of the dissipating interconnection module 20 according to a second embodiment of the invention.

The dissipating interconnection module 20 is shown in FIG. 6 in three dimensions along the x, y and z axes.

"Partially exploded view" is understood to mean a view in which the assembly of the elements is not in exploded view. For example, in FIG. 6, only the lower wall 23 is separated from the remainder of the dissipating interconnection module 20.

The dissipating interconnection module 20 comprises a heat sink 50 comprising the enclosure 21 and a lower wall 23. The lower wall 23 comprises a central wall 231, two vertical walls 233 and two horizontal tabs 232. The two vertical walls 233 are in thermal contact with the central wall 231 and each horizontal wall 233 is in thermal contact with a horizontal tab 232.

The lower wall 23 is configured for being in thermal contact with the second thermal exchange surface 302 of the expansion card 30, with each of the two tabs 212 of the enclosure 21 of the heat sink 50 and with the fluid cooling system 13 of the first electronic board 1.

The lower wall 23 has the same number of holes as the attachment system 201 has screws. For example, as shown in FIG. 6, the attachment system 201 has three screws and the lower wall 23 has three holes. The attachment system 201 may thus advantageously be used for removably mechanically attaching the enclosure 21 to the lower wall 23 instead of removably mechanically attaching the enclosure 21 to the first electronic board 1 as in the first embodiment. The dissipating interconnection module 20 may then be removably mechanically attached to the first electronic board 1 by an attachment system, for example an attachment system comprising at least two screws. The at least two screws then removably mechanically attach the horizontal tabs 232 of the lower wall to the first electronic board 1 by the holes of the horizontal tabs 232. Since the enclosure 21 and the interconnection electronic board 22 are removably mechanically attached to the lower wall 23, the dissipating interconnection module 20 is then removably mechanically attached to the first electronic board 1.

In a preferred embodiment, the horizontal tabs 232, the vertical walls 233 and the central wall 231 of the lower wall 23 are united as shown in FIG. 6. The lower wall 23 is then a single part. Because of the lower wall 23, the thermal contact between the dissipating interconnection module 20 and the fluid cooling system 13 can be separated, for example when the dissipating interconnection module 20 cannot be placed directly on the fluid cooling system 13 because of the arrangement of the components on the first electronic board 1, for example on the motherboard of a compute blade.

FIG. 7 shows a schematic view of the dissipating interconnection module 20 according to a second embodiment of the invention.

The dissipating interconnection module 20 is shown schematically in FIG. 7 in three dimensions along the three axes x, y and z.

In FIG. 7, the dissipating interconnection module 20 is shown when the lower wall 23 is removably mechanically attached to the enclosure 21 of the heat sink 50 and to the interconnection electronic board 22 by the attachment system 201.

FIG. 8 shows a schematic side view of the dissipating interconnection module 20 according to a second embodiment of the invention.

"Side view" is understood to mean a view along one of the side references A or B. FIG. 8 shows a schematic view of side A along the reference A. The view of side A is opposite to the view of side B of the dissipating interconnection module 20. The side view B is the view in the plane of the y transverse axis and the z axis, of the side of the connector 223 and the electronic interconnection board 22.

FIG. 8 shows the dissipating interconnection module 20 according to a second embodiment of the invention when it is removably mechanically attached to the first electronic board 1. The dissipating interconnection module 20 is removably mechanically attached to a fluid cooling system 13 of the electronic board 1 by the attachment system 201 already previously presented. This fluid cooling system 13 is attached to the first electronic board 1.

When the dissipating interconnection module 20 according to the second embodiment of the invention is removably mechanically attached to the first electronic board 1, for example by being removably mechanically attached to the fluid cooling system 13 as shown in FIG. 8, the horizontal tabs 232 of the lower wall 23 are in thermal contact with the fluid cooling system 13 and each horizontal tab is in thermal contact with a vertical wall 233. As shown in FIG. 8 and in a preferred embodiment, the tabs 233 are united with the vertical walls 233.

The lower wall 23 is then inserted between the enclosure 21 of the heat sink 50 and the fluid cooling system 13 of the first electronic board 1.

When it is indicated that "the horizontal tabs 233 are in thermal contact with the fluid cooling system 13," it is understood that at least one part of the lower surface of the horizontal tabs 233 is in thermal contact with at least one part of the fluid cooling system 13 included in the first electronic board 1.

With this thermal contact, the heat released by the expansion card 30 captured by the central wall 231 of the lower wall 23 and by the upper wall 211 of the enclosure 21 can be redirected to the fluid cooling system 13.

In a preferred embodiment, a thermal interface is inserted near each thermal contact, as shown in FIG. 8. Meaning that there is a thermal interface at each thermal contact, for example, a thermal interface 404 is present between each horizontal tab 232 and the fluid cooling system 13.

The lower wall 23 also provides a turnkey solution for the installation of an expansion card 30 on a first electronic board 1 having little available space or for which the fluid cooling system 13 is hard to reach. This also makes it possible to have a ready to use expansion card 30, since the thermal contacts of the heat exchange surfaces of the expansion card 30 are already formed by thermal interfaces inside the dissipating interconnection module 20. It is then sufficient for an operator to make a thermal contact of the horizontal tabs 232 with the fluid cooling system 13, to removably mechanically attach the dissipating interconnection module 20 to the first electronic board 1 and to connect the connector 223 from the interconnection electronic board to an ad hoc connector 304 of the first electronic board 1.

What is claimed is:

1. A dissipating interconnection module for an M.2 form factor expansion card, wherein said M.2 form factor expansion card has to be connected to a first electronic board comprising a fluid cooling system, wherein said M.2 form factor expansion card comprises a first thermal exchange surface, a second thermal exchange surface and at least one first M.2 connector configured for being connected to at least one second M.2 connector, and wherein the dissipating interconnection module comprises:
a heat sink, wherein said heat sink comprises:
an enclosure comprising an upper wall configured for being in thermal contact with the first thermal exchange surface of the M.2 form factor expansion card, wherein the enclosure further comprises two tabs, wherein each tab is configured for being in thermal contact with the upper wall of the enclosure and for being in thermal contact with the fluid cooling system of the first electronic board, and wherein the upper wall and the two tabs of the enclosure are arranged so as to form a space in which the M.2 form factor expansion card can be received;
a mechanical attachment system configured for removably mechanically attaching the M.2 form factor expansion card to the heat sink;
an interconnection electronic board, wherein said interconnection electronic board comprises the at least one second M.2 connector, at least a third electrical connector configured to be connected to at least a fourth electrical connector of the first electronic board, and
wherein the interconnection electronic board is configured for being removably mechanically attached to the heat sink;
wherein the dissipating interconnection module is configured for being removably mechanically attached to the first electronic board.

2. The dissipating interconnection module according to claim 1 wherein the heat sink further comprises a lower wall configured for being in thermal contact with the second thermal exchange surface of the M.2 form factor expansion card, with each tab of the enclosure of the heat sink and with the fluid cooling system, wherein said lower wall is inserted between the enclosure of the heat sink and the fluid cooling system of the first electronic board.

3. The dissipating interconnection module according to claim 1 wherein the heat sink comprises a plurality of thermal interfaces; wherein a thermal interface of the plurality of thermal interfaces is between the thermal contact of the upper wall of the enclosure and the first thermal exchange surface, and another thermal interface of the plurality of thermal interfaces is between the thermal contact of each tab of the enclosure and the fluid cooling system.

4. The dissipating interconnection module according to claim 1 wherein the M.2 form factor expansion card is an M.2 form factor SSD drive.

5. The dissipating interconnection module according to claim 1 wherein the mechanical attachment system for the heat sink comprises at least one screw.

6. The dissipating interconnection module according to claim 1 wherein the dissipating interconnection module is removably mechanically attached to the first electronic board by an attachment system comprising at least one screw.

7. The dissipating interconnection module according to claim 1 wherein the interconnection electronic board is removably mechanically attached to the heat sink by an attachment system comprising at least one screw.

8. The dissipating interconnection module according to claim 1 wherein the third electrical connector of the interconnection electronic board and the fourth electrical connector of the first electronic board are storage connectors of a same type.

* * * * *